United States Patent [19]

Critendon

[11] 4,014,366
[45] Mar. 29, 1977

[54] ORIFICE FITTING CONVERSION APPARATUS

[76] Inventor: Morris K. Critendon, P.O. Box 1639, Houston, Tex. 77001

[22] Filed: July 28, 1975

[21] Appl. No.: 599,381

Related U.S. Application Data

[63] Continuation of Ser. No. 451,934, March 18, 1974, abandoned.

[52] U.S. Cl. .................................. 138/44; 138/94.3
[51] Int. Cl.² ........................................... F16D 1/00
[58] Field of Search ............. 138/44, 40, 37, 94.3, 138/94; 73/211; 277/11

[56] References Cited

UNITED STATES PATENTS

| 2,688,987 | 9/1954 | Whalen | 138/44 |
| 3,781,043 | 12/1973 | Hagmann | 277/11 |

Primary Examiner—Richard E. Aegerter
Assistant Examiner—L. Footland
Attorney, Agent, or Firm—Pravel, Wilson & Gambrell

[57] ABSTRACT

The present invention provides an apparatus for converting an orifice fitting for an orifice plate, of the type known as a "simplex" or "semi" orifice fitting, in a pipeline so that the orifice plate in the orifice fitting may be replaced or removed while maintaining the product in the pipeline under pressure.

9 Claims, 8 Drawing Figures

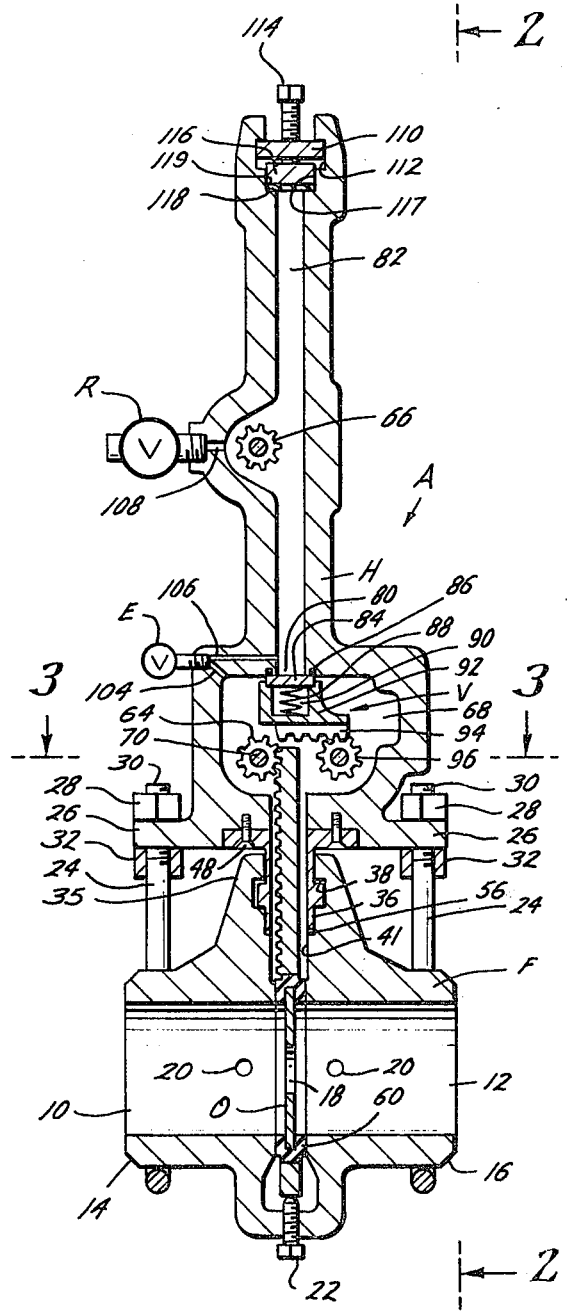
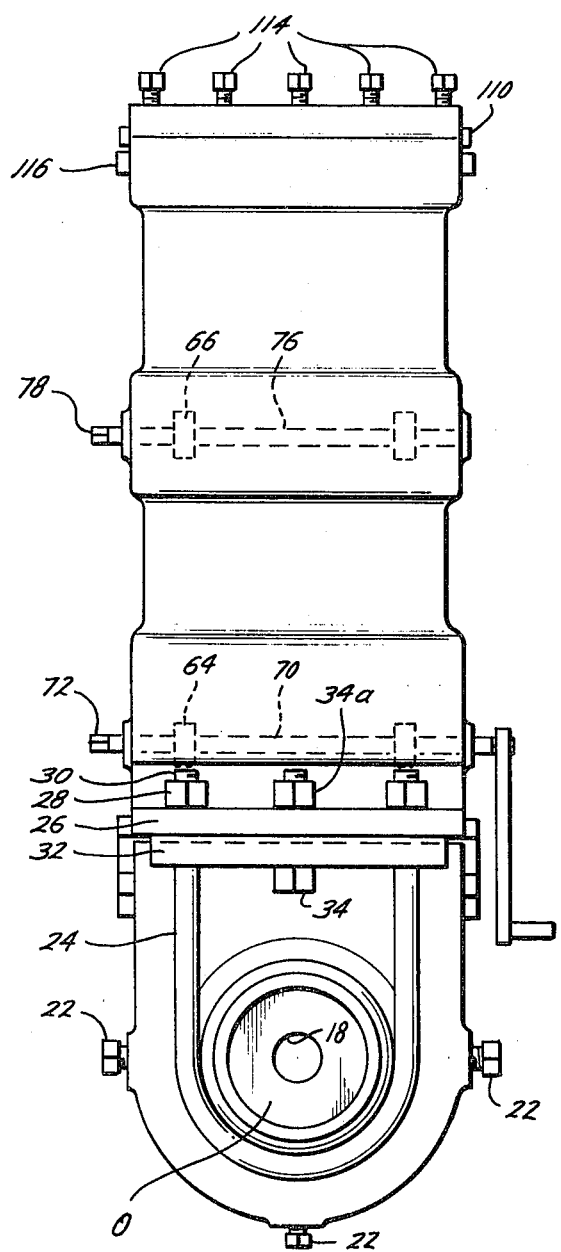

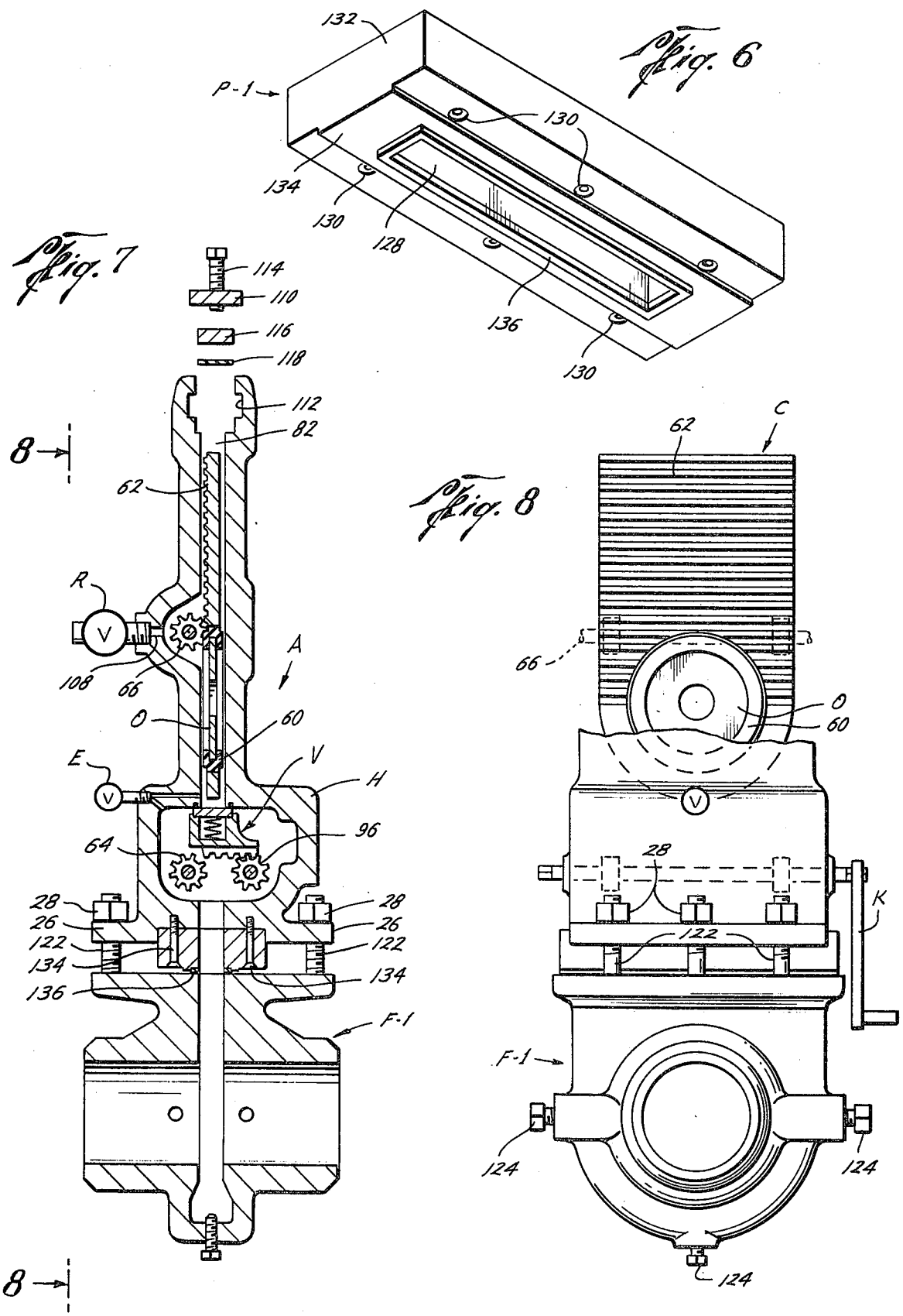

ORIFICE FITTING CONVERSION APPARATUS

This is a continuation, of application Ser. No. 451,934, filed Mar. 18, 1974, now abandoned.

BACKGROUND OF THE INVENTION

1. Field of the Invention

The present invention relates to conversion of orifice fittings.

2. Description of the Prior Art

Orifice plates have been used in pipelines carrying gas or liquid to form pressure differentials for metering purposes. In addition to orifice flanges, two types of orifice fittings have been used to mount these orifice plates in a pipeline.

A first type of orifice fitting, known as a "senior" fitting, had two compartments or chambers separated by a valve mounted in the orifice fitting. A first one of the compartments held the orifice plate in a position for use in the pipeline. When it became desirable to inspect, repair, replace or otherwise service the orifice plate, the valve was opened and the plate moved therethrough to the second compartment. The valve was then again closed, so that the second compartment could be opened and the orifice plate serviced while pressure was maintained in the pipeline by the valve in the "senior" fitting. Examples of this type fitting are disclosed in U.S. Pat. Nos. 1,569,305; 1,965,826; 2,014,682; 2,050,544; 2,688,987. There were also several special constructions or types of "senior" fittings, such as those in U.S. Pat. Nos. 2,896,688 and 2,964,063.

A second orifice fitting, commonly known in the art as a "simplex," "semi" or "junior" fitting had no valve and only a single orifice chamber, in which the orifice plate was mounted in place in the pipeline. In order to remove the orifice plate from this type of fitting, pressure in the pipeline had first to be abated, a costly, time-consuming operation during which product was lost from the line. Numerous of these "junior" fittings have been installed in pipelines, and although these fittings are not as desirable as the "senior" fittings for reasons of ecology or economy, the cost of removing them from the pipeline and replacing them with "senior" fittings has limited their replacement.

SUMMARY OF THE INVENTION

Briefly, the present invention provides a new and improved apparatus for converting an orifice fitting in a pressurized fluid line so that an orifice plate in the fitting is removable therefrom for servicing and repair without loss of pressure in the line. The orifice plate is supported by an orifice plate carrier for movement to and from an operative position in the fitting and an extracted position out of the fitting. An adapter housing receives the orifice plate in a chamber formed in such housing when the adapter plate is in the extracted position. A service opening is formed in the housing adjacent the chamber to provide access to the orifice plate for servicing and repair. A closure valve mounted in the adapter housing opens the chamber in the adapter housing for movement of the orifice plate carrier into and out of the chamber, and further seals the chamber against pressure in the line when closed. A vent valve relieves pressure from the chamber so that the orifice plate may be serviced and repaired while the closure valve seals the chamber against line pressure so that the line may continue to operate with the fluid under pressure therein.

It is an object of the present invention to provide a new and improved apparatus for conversion of orifice fittings.

BRIEF DESCRIPTION OF THE DRAWINGS

FIG. 1 is an elevation view, taken in cross-section, of the apparatus of the present invention mounted with a first type of "junior" fitting with the orifice plate and carrier in an operative position in the fitting;

FIG. 2 is a view taken along the lines 2—2 of FIG. 1;

FIG. 6 is an isometric view of an adapter for mounting the apparatus of the present invention with a second type of "junior" fitting;

FIG. 7 is a partially exploded elevation view, taken in cross-section, of the apparatus of the present invention mounted with a second type of "junior" fitting, with the orifice plate and carrier in the extracted position; and FIG. 8 is a view taken along the lines 8—8 of FIG. 7 with a portion of the apparatus removed to better illustrate other portions thereof.

DESCRIPTION OF THE PREFERRED EMBODIMENT

Figure 3:
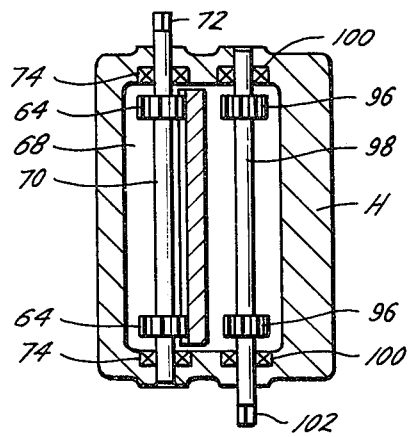
FIG. 3 is a cross-sectional view taken along the lines 3—3 of FIG. 1.

In the drawings, the letter A designates generally the apparatus of the present invention for converting an orifice fitting F in a pressurized fluid line so that an orifice plate O in the fitting F is removable therefrom for servicing and repair without loss of pressure in the line. The fitting F is a conventional, valveless, single-chamber "simplex" orifice plate holder, sold for example by the Daniel Orifice Fitting Company, having open ends 10 and 12 at opposite ends of a fitting body thereof for connection to a pipe or pipeline or other conduit used for fluid handling, production, processing or distribution of gases and liquids. The fitting F has lips 14 and 16 formed adjacent the openings 10 and 12, respectively, so that the pipeline may be welded thereto. It should be understood that the apparatus A of the present invention is also suitable for use with fittings having mounting flanges formed therewith for attachment to pipe.

As is conventional, the orifice plate O has a central opening 18 formed therein to create a pressure differential or drop as the fluid passes therethrough. This pressure differential is sensed by conventional measuring instruments or recorders connected to the fitting F through tap holes 20 formed on opposite sides of the orifice plate O.

Plural adjustable positioning stop screws 22 are mounted with the fitting F to support and center the orifice plate O in the proper operating position in the body of the fitting F. The apparatus A is mounted with the fitting F by plural U-bolts 24 which pass about the fitting F adjacent the lips 14 and 16 and extend upwardly through suitable mounting flanges 26 formed at a lower portion of the apparatus A in order to receive nuts 28 at threaded upper ends 30.

A support bar 32 is mounted beneath the flange 26 of the apparatus A by a center bolt 32 and nut 34a (FIG. 2) to add rigidity to the flange 26 and strengthen the flange 26 against bending under pressure.

The support bar 32 has suitable openings formed therein for passage of the upper ends of the U-bolts 24 therethrough. It should be understood that the support bar 32 need not be used if pressure in the line containing the fitting F does not make added strength and rigidity of the flange 26 necessary. In the fitting F, a first transversely extending slot, or sealing bar slot, is formed therethrough at an upper portion 35 extending transversely to fluid flow between the ends 10 and 12 adjacent a surface 36 for receiving a sealing bar, when the fitting F serves as a "simplex" fitting. Further, a second slot, or clamping bar slot, slightly wider than the first slot is formed adjacent a surface 38 above the first slot for receiving a clamping bar to hold the sealing bar in position when the fitting F is used as a "simplex" orifice holder.

Figure 4:
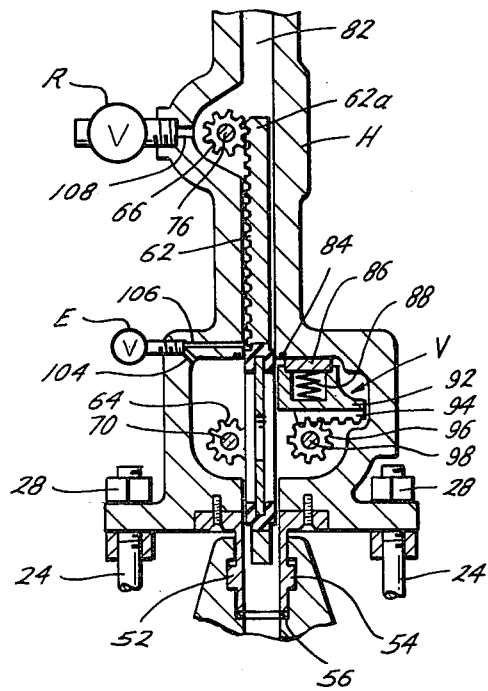
FIG. 4 is an elevation view, taken in cross-section, of a portion of the apparatus of FIG. 1, with the orifice plate and carrier in a partially extracted position.
Figure 5:
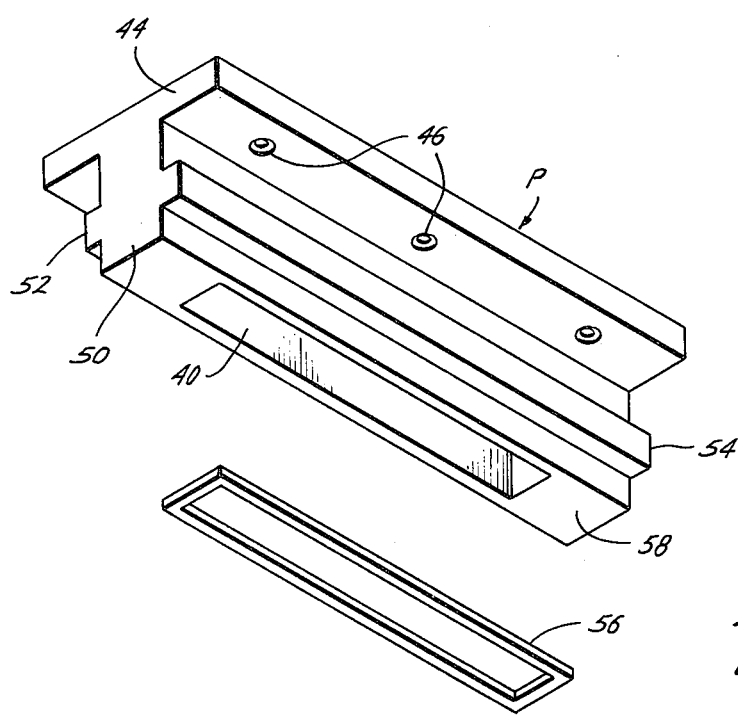
FIG. 5 is an exploded isometric view of an adapter for mounting the apparatus of the present invention with the "junior" fitting in FIG. 1.

An adapter plate P of the present invention (FIGS. 1, 4 and 5), whose structure is set forth below, is mounted in the slots adjacent surfaces 36 and 38 in the fitting F to mount an adapter housing H of the apparatus A with the fitting F. The adapter plate P has a rectangular opening 40 (FIG. 5) formed extending vertically therethrough for passage of the orifice plate O for movement through a service slot, adjacent a pair of surfaces 41 in the fitting F (FIG. 1) to and from an operative position in the fitting F (FIG. 1) and an extracted position out of the fitting F (FIG. 4). The adapter plate P is generally T-shaped in vertical cross-section (FIG. 5) having outwardly extending upper support arms 42 and 44 formed therewith to fit within correspondingly shaped recesses in the adapter housing H (FIG. 1). Plural openings 46 are formed in the support arms 42 and 44 to permit insertion of screws or other suitable mounting means 48 so that the adapter plate P may be mounted within the adapter housing H (FIG. 1).

The adapter plate P further includes a downwardly extending center member 50 to fit into the sealing bar slot formed in the fitting F adjacent surface 36. Outwardly extending lugs 52 and 54 are formed with the center member 50 and fit within the clamping bar slot adjacent surface 38 in the fitting F to hold the adapter plate P in position within the fitting F.

The adapter plate P is mounted with the fitting F by inserting the lugs 52 and 54 into the clamping bar slot adjacent surface 38 in the fitting F and sliding the adapter plate P through such transverse opening into position. A rectangular gasket 56 is mounted beneath a lower surface 58 of the adapter plate P about the opening 40 therein in order to seal the connection between the adapter plate P and the fitting F.

The adapter plate P thus permits the apparatus A to be installed with Daniel "simplex" orifice fitting. As will be set forth below, the apparatus A of the present invention is used to convert and modify other types of commercially available "semi" or "junior" fittings requiring only an adapter plate for the particular model of fitting to be converted. Consequently, to preserve brevity in the drawings, discussion of structure common to both embodiments of the apparatus A includes reference to FIGURES where such the apparatus A is mounted with different fittings, but the common structure thereof is not changed in structure or function, and only moved to various operating positions.

The orifice plate O of the apparatus A is mounted in an annular seal 60 (FIGS. 1 and 8) in a lower end of an orifice plate carrier C which supports the orifice plate O for movement to and from the operative position in the fitting F (FIG. 1), a partially extracted position between the fitting F and the housing H (FIG. 4), and an extracted position within the housing H (FIG. 7).

The orifice carrier plate C has plural transversely extending rack teeth 62 formed (FIG. 8) extending vertically along a surface thereof to permit movement of the orifice plate O with respect to the orifice fitting F. The rack teeth 62 on the carrier plate C are engaged by teeth of a lower pinion 64 and teeth of an upper pinion 66 so that the carrier plate C may be moved with respect to the fitting F, in a manner to be set forth.

The lower carrier pinion 64 is mounted in a lower chamber 68 in the adapter housing H on a pinion shaft 70 (FIG. 3). An end portion 72 is squared or otherwise suitably formed on the pinion shaft 70 to be engaged by a wrench or other suitable crank or tool K (FIG. 8) externally of the adapter housing H to permit rotational movement of the pinion shaft 70 by means of such tool. Stuffing box assemblies 74 are mounted at each end of the pinion shaft 70 in the adapter housing H for sealing purposes. The lower pinion 64 engages the rack teeth 62 on the carrier plate C and moves the carrier plate C with respect to the adapter housing H so that the orifice plate O may be moved between the operative position in the fitting F (FIG. 1) and the partially extracted position (FIG. 4).

The rack teeth 62 on the carrier plate C extend sufficiently far down on the carrier plate C past the orifice plate O and seal 60 mounted therein (FIG. 8) so that when the carrier plate C is in the partially extracted position (FIG. 4) the lower pinion 64 engages a lower portion of the rack teeth 62 adjacent the orifice plate O and the upper pinion 66 simultaneously engages the rack teeth 62 at an upper portion 62a thereof so that control of movement of the carrier plate C may be transferred to the upper pinion 66. The upper pinion 66 engages the rack teeth 62 when the lower pinion 64 has moved the carrier plate C upwardly to the partially extracted position in the adapter housing H (FIG. 4) for such transfer of control of movement and thereafter moves the orifice carrier plate C to the extracted position (FIG. 7). The upper pinion 66 is mounted with an upper pinion shaft 76 having an end portion 78 squared or otherwise formed thereon to permit engagement by a wrench, crank or other suitable instrument to rotate the upper pinion shaft 76 and cause consequent movement of the carrier plate C. Suitable stuffing box assemblies are provided in the adapter housing H for the pinion shaft 76 for sealing purposes.

A closure valve V of the apparatus A opens and closes a passage 80 connecting the lower chamber 68 and an upper, or service, chamber 82 in the adapter housing H. A sealing bar 84 engages a seal or gasket 86 mounted in the adapter housing H adjacent the passage 80. A spring 88 mounted in a slot 90 in a valve member 92 of the closure valve V urges the sealing bar 86 firmly against the seal 86 to seal the passage 80 when the closure valve V is blocking such passage. Pressure in the chamber 68 from fluid pressure in the line further urges the sealing bar 86 and valve V into place blocking the passage 80. A rack gear 94 is mounted on a lower surface of the valve member 92. The teeth on the rack gear 94 engage pinion teeth 96 mounted on pinion shaft 98 (FIG. 3) for rotational movement with respect to the adapter housing H. Conventional stuffing box assemblies 100 are mounted between the pinion shaft 98 and the adapter housing H for sealing purposes. An end 102 is squared or otherwise formed on the pinion end of shaft 98 so that a wrench or other suitable tool may be used to rotate the pinion shaft 98 causing the pinion teeth 96 to engage the rack teeth 94 and move the closure valve V to a position closing the passage 80 (FIG. 1) and a position opening the passage 80 (FIG. 4) for passage of the orifice carrier C therethrough during movement of the orifice plate O in the manner set forth above.

An equalizer valve E (FIGS. 1 and 4) in communication through a conduit 104 with the lower chamber 68 and in communication through a conduit 106 with the upper chamber 82 of the adapter housing H permits the pressure in the lower chamber 68 and in the upper chamber 82 to be equalized in order to permit ease of movement of the closure valve V.

A vent or relief valve R is connected by a conduit 108 to the upper housing 82 in the adapter housing H and permits the pressure in the upper housing 82 to be vented or relieved so that the orifice plate O may subsequently be removed for repair or servicing, if necessary.

A clamping bar 110 is inserted in a transverse mounting slot formed adjacent a surface 112 in the adapter housing H at an upper end of the upper chamber 82. A plurality of set screws 114 are inserted through openings formed in the clamping bar 110 and engage a sealing bar 116 mounted in a transverse slot adjacent a surface 117 to hold a sealing bar gasket 118 firmly in place against a surface 119 to seal the upper opening of the upper chamber 82. The clamping bar 110 and sealing bar 116 are removed to provide a service opening for access to the orifice plate O for service and repair.

As has been set forth above, the apparatus A of the present invention is suitable for use with several commercially available types of "semi" or "simplex" orifice fittings. For example, replacement of the adapter plate P in the apparatus A with an alternative adapter plate P-1 (FIG. 6) permits conversion of a valveless, single-chamber "simplex" orifice fitting F-1 of the type sold by the Robinson Orifice Fitting Company, and other companies, so that the orifice plate may be removed and serviced without loss of line pressure. The adapter plate P-1 is the only modification to the apparatus A for conversion of these fittings, and the remaining structure of the apparatus A used in conversion of the orifice fitting F-1 is of like structure and function to the apparatus A used in conversion of the orifice fitting F, and consequently like reference numerals are used.

The orifice fitting F-1 has a plurality of upstanding screws 122 formed on an upper surface 123 thereof which pass through the openings formed in the flanges 26 and receive the nuts 28 to mount the adapter housing H with the orifice fitting F-1. A plurality of positioning screws 124 are mounted with the orifice fitting F-1 in order to center the orifice plate O therein.

Considering the adapter plate P-1 more in detail FIG. 6), a rectangular, vertically extending opening 128 is formed therethrough so that the orifice plate O and the orifice plate carrier C may pass to and from the operative position in the fitting F-1 and the retracted position in the adapter housing H (FIG. 7). A plurality of openings 130 are formed extending upwardly through an upper body member 132 of the adapter plate P-1 so that corresponding screws 134 may be inserted therein to mount the adapter plate P-1 in a corresponding recess in the adapter housing H. A shoulder 134 is formed extending downwardly from the upper body portion 132 in order to force a rectangular gasket 136 firmly into engagement with the upper surface of fitting F-1 to thereby provide a seal between the adapter plate P-1 and the orifice fitting F-1.

In the operation of the present invention, the conventional "simplex" fittings are first prepared for conversion by removing the clamping bars screws, clamping bar and clamping bar gasket, together with the orifice plate and sealing ring of the orifice fitting. For this initial installation, the pressure in the line having the fitting installed therein is preferably relieved.

The apparatus A is then mounted with the fitting F and the pipeline or conduit with which the fitting is installed may then again be pressurized. The equalizer valve E is opened to permit the pressure in the upper chamber 82 to equalize with the pressure from the pipeline in the lower chamber 68 in the adapter housing H, so that the closure valve V may be moved to the open position (FIG. 7) by the pinion gear 96. The upper pinion 66 is then rotated to lower the orifice plate carrier C with the orifice plate O therein downwardly from the upper chamber 82 past the open valve V through the lower chamber 68. When the plate carrier C reaches an intermediate position (FIG. 4), the rack gears 62 move out of engagement with the upper pinion gear 66, but are already in contact with the lower pinion 64, as has been set forth above. The pinion shaft 70 of the lower pinion 64 is then rotated to further lower the orifice plate carrier C and the orifice plate O downwardly through the adapter plate P and into the operative position in the fitting F (FIG. 1). The closure valve V is then moved to its closed position (FIG. 1), and the relief valve R may then be operated to relieve any fluid pressure remaining in the upper chamber 82.

When it is desirable after usage of the orifice plate O over a period of time to inspect, service or repair the orifice plate O, the equalizer valve E is operated, equalizing the pressure between the lower chamber 68 and the upper chamber 82 in the adapter housing H, so that the closure valve V may move to the open position. The pinion shaft 70 is then rotated so that the pinion gears 64 engage the rack gears 62 on the carrier plate C, moving the orifice carrier plate C upwardly from the operative position in the fitting F through the open closure valve V and into the upper chamber 82 in the adapter housing H. When the orifice carrier plate C reaches the partially extracted position (FIG. 4), the pinion gear 66 engages the rack gear 62 on the carrier plate C. The pinion shaft 76 is then rotated to continue upward movement of the carrier plate C into the adapter housing H. When the orifice plate O and the orifice carrier plate C are fully within the upper chamber 82 of the adapter housing H, the closure valve V is moved to the closed position by means of the pinion gear 96 (FIG. 8). The equalizer valve E is then closed, and the relief valve R opened to vent the fluid under pressure from the upper chamber 82 should it be desirable or necessary to totally remove the orifice plate carrier C from the upper chamber 82. The set screws 114 are then loosened to relieve tension on the seal bar 116 and the seal bar gasket 118. The clamping bar 110, the seal bar 116 and the seal bar gasket 118 are then moved horizontally outwardly from the clamping bar holder formed in the upper end of the adapter housing H so that the orifice carrier plate C within the adapter housing H is thereby accessible.

After the orifice plate O has been repaired or inspected, the orifice plate carrier C with the orifice plate O therein are then inserted into the adapter housing H, and the clamping bar 110, the sealing bar 116 and the sealing bar gasket 118 inserted, and the set screws 114 tightened to form a seal at the upper end of the adapter housing H. The orifice plate carrier C and the orifice plate O may then be returned to the operative position in the orifice fitting F in the manner set forth above.

It is to be noted that the closure valve V is mounted in the housing H of the apparatus A and thus no structural modification of the fitting F or its connection in the pipe, which is often a welded connection, need be performed to convert the fitting F.

It is important to note that the apparatus A of the present invention, with the valve V mounted in the housing H, is capable of being mounted with several commercially available valveless "simplex" or "junior" fittings, requiring only an adapter plate to fit within the sealing bar and clamping bar slots of the particular fitting to be converted. Further, in converting such fittings according to the present invention, there is no need to disturb connections of the pipe to the body of the fitting which are often welded thereto, since the apparatus A permits direct use of the body of the fitting being converted, whereas direct substitution by replacement of the "junior" fitting by a "senior" fitting would require such disturbance.

Further, after conversion of the "junior" fitting with the present invention, the orifice plate O mounted therein can be checked, replaced or serviced without requiring that the flow of product in the line be shut, and further at a considerable saving of product over the unconverted "junior" fittings. When converted, only the product from the upper chamber 82 of the housing H is lost when servicing an orifice plate therein, whereas with the unconverted fitting, the product between valves in the line on either side of the fitting having the orifice plate to be serviced in generally lost.

The foregoing disclosure and description of the invention are illustrative and explanatory thereof, and various changes in the size, shape, and materials as well as in the details of the illustrated construction may be made with departing from the spirit of the invention.

I claim:

1. An apparatus for mounting with and converting a junior or simplex orifice fitting in a pressurized fluid line to a senior fitting so that an orifice plate in the junior fitting is thereafter removable therefrom for service and repair without loss of pressure in the line, comprising:
   an adapter housing having:
      an upper portion;
      a lower portion having a lower portion surface;
      a vertical upper chamber formed in said upper portion and having an upper end and a lower end;
      a lower chamber formed in said lower portion and having an upper end and a lower end;
      said lower end of said upper chamber adjoining said upper end of said lower chamber by a passage formed therebetween; and
      said lower chamber formed having a slot extending between said lower portion surface and said lower end of said lower chamber, said slot being substantially vertically aligned with said vertical upper chamber and said passage;
   an adapter plate having:
      an upper surface for engaging said lower portion surface of said adapter housing;
      a central member extending downwardly from said upper surface of said adapter plate; and,
      said central member formed having an opening therein, said opening in substantial vertical alignment with said slot, said passage and said upper chamber;
   fastening means for mounting said adapter plate with said adapter housing;
   an orifice plate carrier mounted for movement in said adapter housing from a lower position wherein said orifice plate carrier extends from said lower chamber through said slot and said opening to an upper position wherein said orifice plate carrier is entirely disposed within said upper chamber;
   lower moving means for moving said orifice plate carrier vertically between the lower position and an intermediate position between the lower position and the upper position, said lower moving means mounted with said lower chamber;
   upper moving means for moving said orifice plate carrier to and from the upper position, said upper moving means moving said orifice plate carrier vertically between the intermediate position and the upper position, said upper moving means mounted with said upper chamber;
   a closure valve movably mounted in said lower chamber for movement to and from a closed position adjacent said passage;
   means for moving said closure valve in said lower chamber between an open position when said orifice plate carrier is in the intermediate position and the closed position when said orifice plate carrier is in the upper position or the lower position;
   vent valve means mounted with said upper chamber for relieving fluid pressure from said upper chamber when said closure valve is in the closed position and said orifice carrier plate is in the upper position; and,
   a service opening adjacent said upper end of said upper chamber of said upper portion to provide access to said orifice plate carrier for service and repair thereof when said orifice plate carrier is in the upper position in said upper chamber.

2. The apparatus of claim 2, wherein:
said lower portion surface of said adapter housing is formed having a recess formed about said slot for receiving said adapter plate for mounting with said adapter housing.

3. The apparatus of claim 2, wherein:
said adapter plate has a lower surface for receiving a gasket.

4. The apparatus of claim 2, wherein:
said adapter plate, said opening, said slot, said passage and said upper chamber are substantially of a rectangular cross-sectional area.

5. The apparatus of claim 2, wherein:
said adapter plate further includes horizontal rectangular lugs centrally formed with said central member.

6. The apparatus of claim 2, wherein:
said lower portion of said adapter housing is formed having flanges therewith, said flanges receiving releasable orifice fitting fasteners.

7. The apparatus of claim 2, wherein:
said closure valve includes means for sealing said upper chamber from fluid in said lower chamber when said orifice plate carrier is in the upper position in said upper chamber for repair and servicing.

8. The apparatus of claim 2, further including:
means for releasably closing said service opening in said upper portion of said adapter housing.

9. The apparatus of claim 2, further including:
equalizer valve means for admitting fluid pressure to said upper chamber from said lower chamber to equalize pressure on said closure valve prior to movement thereof.

* * * * *